United States Patent
Kumar et al.

(10) Patent No.: US 9,178,828 B2
(45) Date of Patent: Nov. 3, 2015

(54) ARCHITECTURE FOR AGENTLESS SERVICE INSERTION

(71) Applicant: CISCO TECHNOLOGY, INC., San Jose, CA (US)

(72) Inventors: Surendra M. Kumar, San Ramon, CA (US); Dileep K. Devireddy, San Jose, CA (US); Nagaraj A. Bagepalli, Fremont, CA (US); Abhijit Patra, Saratoga, CA (US); Vina Ermagan, San Jose, CA (US); Fabio R. Maino, Palo Alto, CA (US); Victor Manuel Moreno, Carlsbad, CA (US); Paul Quinn, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 273 days.

(21) Appl. No.: 13/872,008

(22) Filed: Apr. 26, 2013

(65) Prior Publication Data

US 2014/0321459 A1 Oct. 30, 2014

(51) Int. Cl.
*G06F 9/455* (2006.01)
*H04L 12/851* (2013.01)

(52) U.S. Cl.
CPC ........ *H04L 47/2425* (2013.01); *G06F 9/45533* (2013.01); *G06F 2009/45562* (2013.01)

(58) Field of Classification Search
None
See application file for complete search history.

(56) References Cited

U.S. PATENT DOCUMENTS

| | | | |
|---|---|---|---|
| 8,730,980 B2 | 5/2014 | Bagepalli et al. | |
| 2007/0061441 A1 | 3/2007 | Landis et al. | |
| 2007/0067435 A1 | 3/2007 | Landis et al. | |
| 2008/0019384 A1* | 1/2008 | Wainwright et al. | 370/401 |
| 2010/0054260 A1 | 3/2010 | Pandey et al. | |
| 2012/0147894 A1* | 6/2012 | Mulligan et al. | 370/395.53 |
| 2012/0185853 A1 | 7/2012 | Haviv et al. | |
| 2012/0324442 A1* | 12/2012 | Barde | 718/1 |
| 2015/0071285 A1 | 3/2015 | Kumar et al. | |

OTHER PUBLICATIONS

Farinacci et al., Locator/ID Separation Protocol (LISP), Feb. 12, 2012, IETF, 97 pages, https://tools.ietf.org/pdf/draft-ietf-lisp-22.txt.*
Cisco Systems, Inc., VMware, Inc., "Joint Cisco and Vmware Solution for Optimizing Virtual Desktop Delivery," White Paper, Sep. 2008.
USPTO Sep. 11, 2013 Non-Final Office Action from U.S. Appl. No. 13/337,379.

* cited by examiner

*Primary Examiner* — Hoon J Chung
(74) *Attorney, Agent, or Firm* — Patent Capital Group

(57) ABSTRACT

An example method for service insertion in a network environment is provided in one example and includes configuring a service node by tagging one or more interface ports of a virtual switch function to which the service node is connected with one or more policy identifiers. When data traffic associated with a policy identifier is received on a virtual overlay path the virtual switch function may then terminate the virtual overlay path and direct raw data traffic to the interface port of the service node that is tagged to the policy identifier associated with the data traffic.

21 Claims, 12 Drawing Sheets

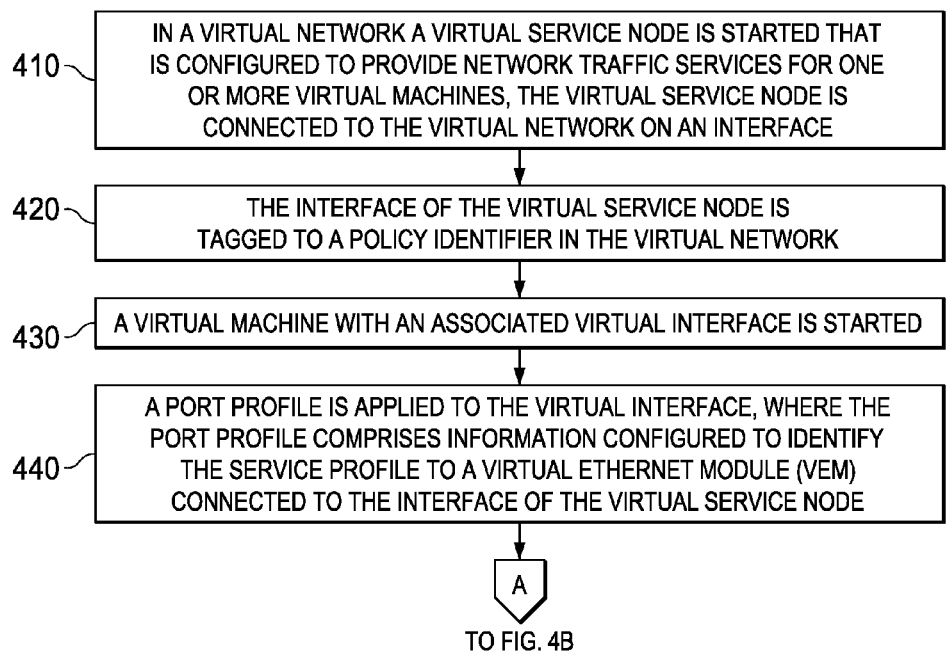

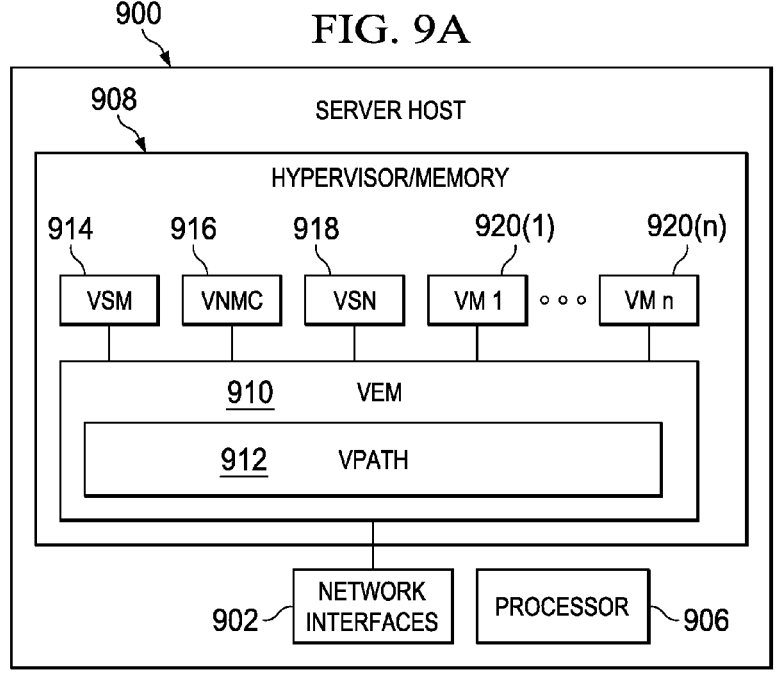
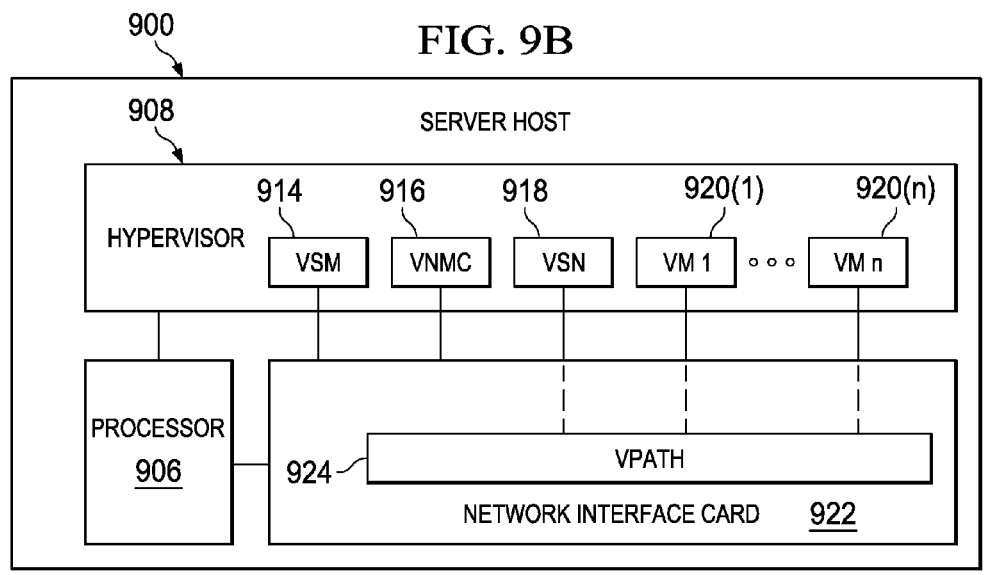

ARCHITECTURE FOR AGENTLESS SERVICE INSERTION

TECHNICAL FIELD

The present disclosure relates to network services and, more particularly, to a system and method for service insertion and provisioning in a network.

BACKGROUND

Data centers may host applications and store large amounts of data for an organization or multiple organizations. An enterprise data center may be privately owned and discretely provide services for a number of customers, with each customer using data center resources by way of private networks. In addition, these data centers provide server and desktop virtualization that is dramatically changing the enterprise network by creating many virtual "networks" which connect virtual machines and the physical networks through virtual switches. In this new network paradigm, many new network service requirements are imposed on modern Information Technology (IT) network infrastructure.

The service requirements (e.g., load balancing, wide area network (WAN) acceleration, network security, etc.) have traditionally been provided by inline network appliances, referred to as service nodes. These inline network appliances do not scale well in a virtualized network environment in which end point applications are provided by virtual machines. At any given point in time, virtual machines are being instantiated, stopped, and dynamically migrated to another physical host. In a virtual network, the network services should support this dynamic provisioning scalability, and virtual machine mobility.

BRIEF DESCRIPTION OF THE DRAWINGS

FIGS. 4A and 4B are flow diagrams of an example process for providing network services in accordance with an embodiment of the disclosure;

FIGS. 9A-9C are example block diagrams of servers in which virtual switch functions according to an embodiment of the disclosure may be implemented.

DETAILED DESCRIPTION OF EXAMPLE EMBODIMENTS

Overview

Figure 1:
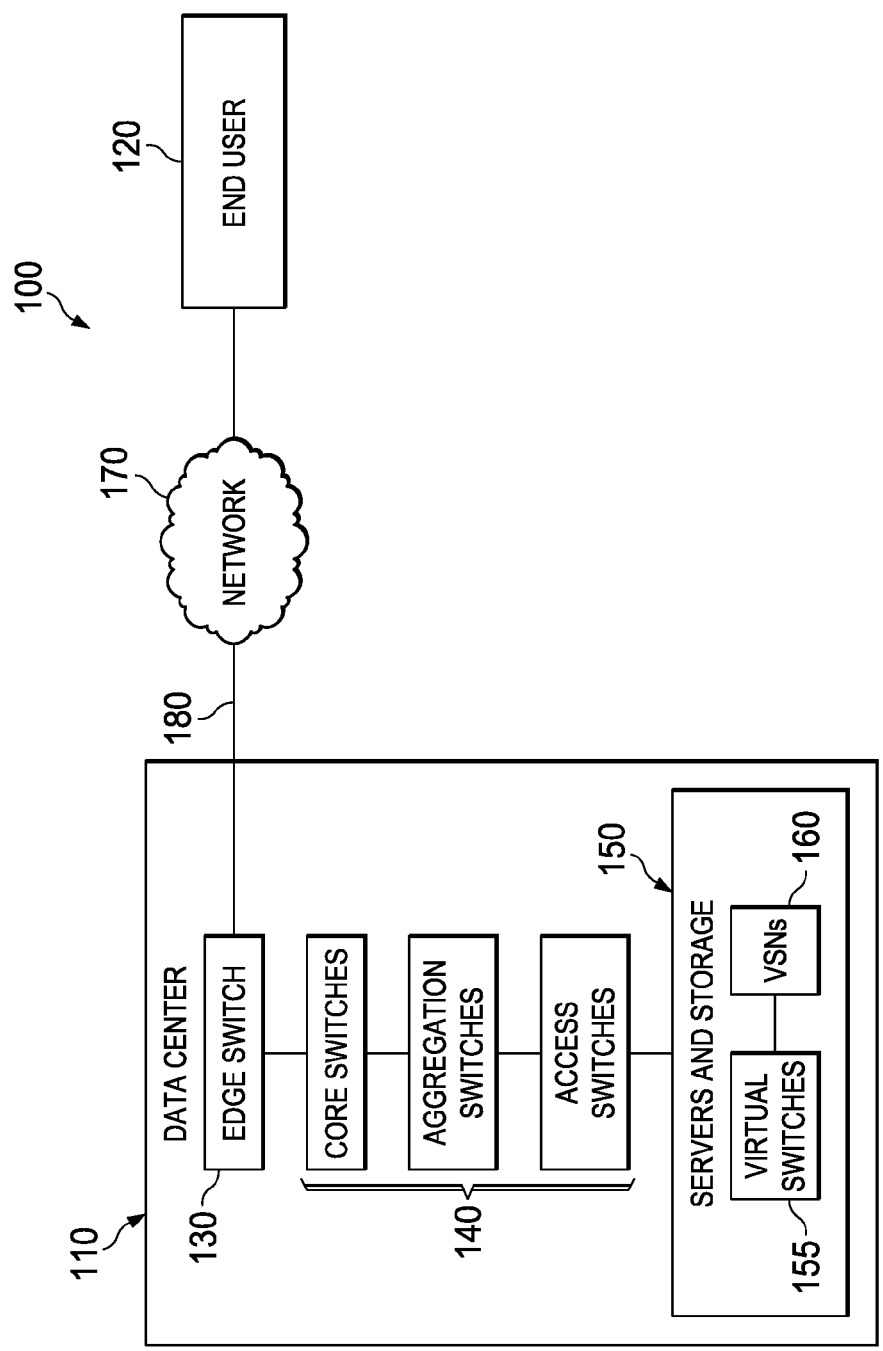
FIG. 1 is a simplified block diagram illustrating an example network with a data center and end users coupled by a Wide Area Network (WAN), where servers in the data centers are configured to deploy virtual service nodes (VSNs) in accordance with an embodiment of the disclosure.

According to embodiments of the disclosure, a system and a method is provided to implement a service node configured to provide network traffic services for one or more hosts in a network. The service node may be inserted (e.g., dynamically and transparently) into the network by associating one or more interface ports of a switch function to which the service node is connected with one or more service policies of the service node. When data traffic associated with a service policy is received on an overlay path, the overlay path may be terminated. The term 'terminated' in this sense can include any activity associated with ending, interrupting, breaking, pausing, or otherwise stopping a communication. The data traffic may then be directed as raw data traffic to the interface port associated with the service policy and the service node providing the service receives the raw data. This allows insertion of the service node without requiring insertion of control functions that would otherwise be necessary to couple the service node to data and control plane mechanisms used for delivery of data traffic in the network. The embodiments may be implemented to handle dynamic characteristics of virtual environments, such as virtual machine or service node migration. The example embodiments also allow service insertion in the physical switch and network environment, or in a hybrid environment.

According to an example embodiment of the disclosure, a system and method is provided to implement a service node configured to provide network traffic services for one or more virtual machines in a virtual network. The virtual service node may be dynamically and transparently inserted into the virtual network by tagging one or more interface ports of a virtual switch function to which the service node is connected with one or more policy identifiers. Data traffic associated with a policy identifier and received on a virtual overlay path may then be directed as raw data traffic to the interface port of the service node that is tagged to the policy identifier associated with the data traffic.

The system and method may be implemented in a virtual network having a service classifier/dispatcher (VPATH) function that controls switching and routing in the data plane of the virtual network, and a service controller, in the form of a Virtual Services Module (VSM) or Virtual Network Management Center (VNMC), that controls configuration and programming of the VPATH function for data plane control. The VPATH function implements switching and routing on virtual overlays through a virtual network including one or more virtual switch functions or Virtual Ethernet Modules (VEMs) implemented in one or more switches or routers in the network and implements control of service node interaction with the network in accordance with the embodiment. In the embodiment, one or more service nodes may be inserted into the network as agentless service nodes, so that an agentless service node is able to send and receive data traffic on a basic switch interface, (e.g., Ethernet or VLAN interface), rather than require that a VPATH function, such as an API or "agent", be embedded within the service node. When data traffic associated with a policy identifier and intended for an agentless service node is received on the VPATH overlay, the VPATH overlay is terminated in the VEM to which the service node is connected by the virtual switch interface rather than having the overlay terminated in the service node itself. To direct the data traffic, VPATH virtual overlay information in the form of a policy identifier may be mapped onto the switch interface to which the service node is connected. When data traffic associated with a policy identifier is received at a VEM, the VPATH overlay is terminated and the data traffic is delivered natively to the switch interface mapped to the policy identifier. The service node receives the data traffic on the interface and then implements service on the data traffic according to the appropriate policy mapped to the interface.

The VPATH function provides configuration programming through the VSM that implements the system functions for the agentless VSNs. Upon configuration of an agentless VSN, or at other appropriate times, the VPATH function discovers the switch ports used by agentless service nodes and maps one or more policy identifiers to the interfaces to which the service nodes are connected. VPATH identifies the interface by a required agentless service node identifier that is configured in a port profile configuration. The service node identifier triggers VPATH to learn the IP address of the VEM of the service node and the interface on which the VSN is connected. The switch ports associated with interfaces of the corresponding service node are tagged as agentless ports. In the example embodiment, VPATH also supports service nodes that integrate embedded agents as well as agentless service nodes that do not include embedded agent. In order to support both agentless service nodes and service nodes with embedded agents the VPATH function determines which traffic on the overlay needs to be terminated at the overlay and which traffic needs to continue on the overlay into a service. Only traffic exiting or entering service nodes without agents needs its overlay terminated by the VPATH function. Once an overlay carrying traffic to an agentless service node is terminated by the VPATH at the VEM to which a service node is connected, only raw data traffic (e.g., raw data packets) are forwarded on the appropriate interfaces (agentless ports) to the service node. The appropriate interfaces are identified by the tags on the interface being associated with a policy identifier. The VEM terminating the overlay maintains traffic flow information so that when the service node sends traffic back to the VPATH terminating the overlay, the return traffic can be sent onward to the sending VPATH of the switch from where the traffic originated in the virtual network.

In another example embodiment of the disclosure, the system and method may be implemented in a network having a virtual switching function and a service overlay path implemented according to a Locator Identifier Separation Protocol (LISP) Mapping System. A virtual service node may be dynamically and transparently inserted into the network by associating one or more interface ports of a virtual switch function to which the service node is connected with one or more service policies of the service node. The association is done by using the LISP Mapping System to associate a Routing Locator (RLOC) to an appropriate service node and service policy. When data traffic associated with a service policy is received at a switching function in the network on the overlay path, the overlay path is terminated and the data traffic is sent as raw data to the interface of the service node that implements the service defined by the policy. Data traffic may be identified by its source and destination and the LISP Mapping System may be used to define a service chain/path, with one or more service nodes, as a sequence of RLOCs the data traffic should go through from source to destination.

Example Embodiments

Referring now to FIG. 1, an example system 100 is shown for a data center and end user environment. System 100 comprises a data center 110 and an end user 120, which may include a data center, other networks, or individual users, etc. Data center 110 and end user 120 can communicate with each other by way of links 180 over a network 170. Data center 110 can may employ one or more edge switches 130 for traffic ingressing or egressing the data center. Data center 110 may also comprise a plurality of servers and storage devices 150. The servers (e.g., blade servers) may host application services (e.g., World Wide Web center applications or remotely hosted virtual machine (VM) applications). The storage devices may be part of a storage area network (SAN) in certain embodiments of the present disclosure.

In operation, system 10 can allow dynamic service insertion in virtual networks, where the service insertion could be done in a transparent manner that does not require modification of the service itself. This stands in contrast to methods that require the services to be aware of the insertion logic by necessitating a coupling of the control functions of the service with the control and data plane mechanisms of the virtual network. This coupling of the control and data plane mechanisms with a service often requires modification of the service itself. When third party services and third party service providers are involved, the requirements for modification are burdensome, or provide a potential barrier to implementation of the service. For example, the modification could require embedding modifications in the form of user space libraries, kernel loadable modules, Application Programming Interfaces (APIs), etc., which provide the functions of "agents" into the service in order to allow the service to interact with the virtual network.

Data center 110 further comprises core switches, aggregator switches and access switches, collectively shown at reference numeral 140, to aggregate and distribute ingress (upstream traffic) and egress (downstream traffic). A plurality of switches is provided at each access, aggregation, and core level to achieve redundancy within data center 110. In this example, the plurality of servers and storage devices 150 employ a plurality of virtual switches 155 and a plurality of virtual service nodes (VSNs) 160 to service network traffic for VMs operating therewith. Typical services provided for network traffic may consist of load balancing and applications control, WAN acceleration, network security, and network analysis and monitoring. WAN acceleration typically involves application and data acceleration, e.g., using compression techniques to reduce hardware throughput requirements. According to the techniques provided herein, selected VSNs may be created in such a manner that they are started, instantiated, stopped or migrated within the virtual network, dynamically and transparently to the service. Accordingly, network services can be scaled to meet demand without requiring that the services be changed or modified for operation in the network.

Figure 2:
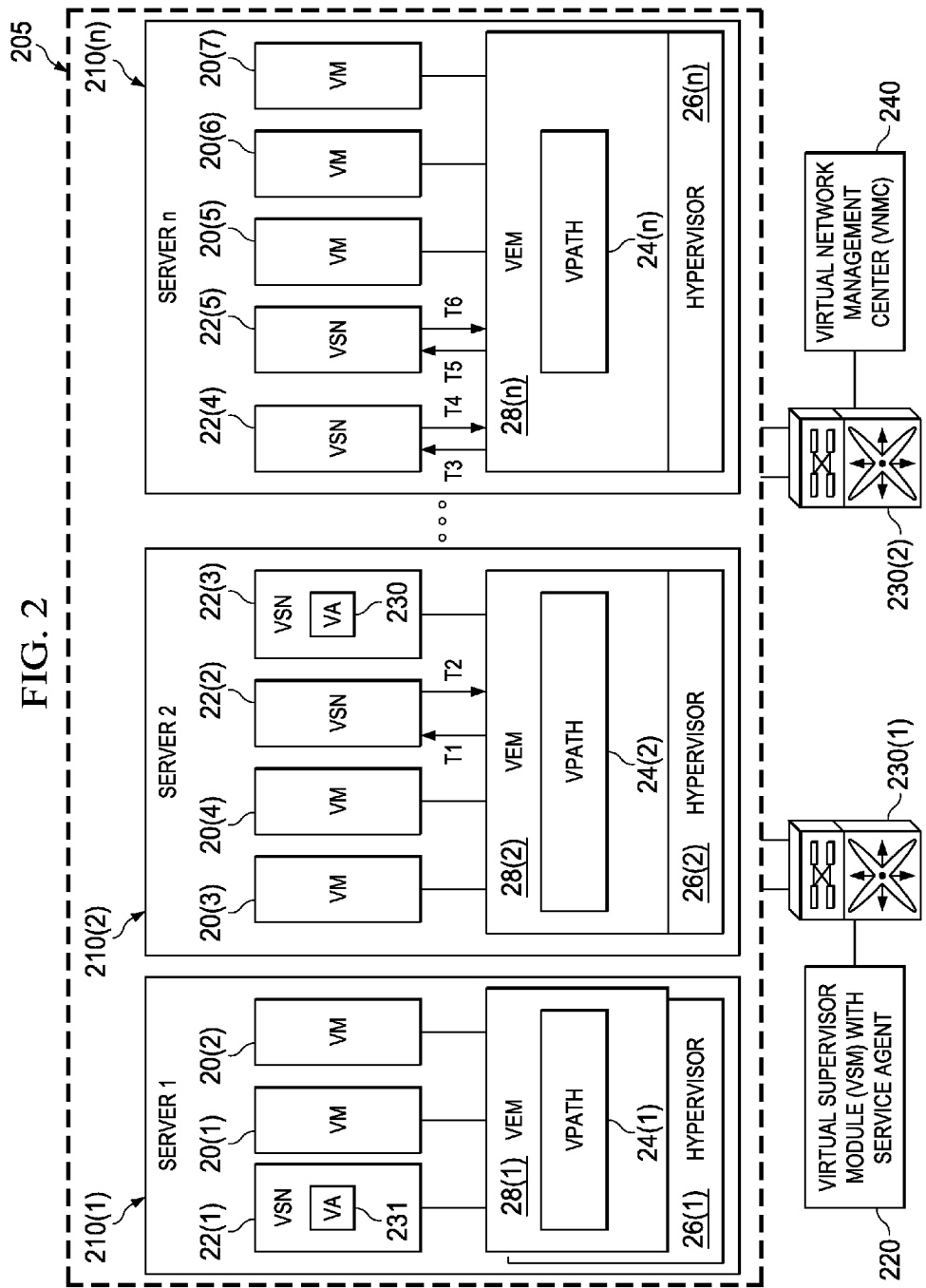
FIG. 2 is simplified block diagram illustrating example details of a portion of the network of FIG. 1 in accordance with an embodiment of the disclosures.

Referring now to FIG. 2, therein is a simplified block diagram illustrating example details of a portion of the network of FIG. 1 in accordance with one embodiment of the disclosure. FIG. 2 illustrates an example data center, which could be, for example, data center 110. The environment comprises a virtual supervisor module (VSM) 220, switches 230(1) and 230(2), a virtual network management center (VNMC) 240, and a plurality of servers 210(1)-210(n). Each server 210(1)-210(n) hosts hypervisor 26(1)-26(n), respectively. As used herein, the value n represents any quantity of items referred to and may vary from item to item. Hypervisors are hardware abstract layers that provide operating system independence for application services provided by VMs. Hypervisor 26(1) supports VSN 22(1), and VMs 20(1) and 20(2), hypervisor 26(2) supports VSNs 22(2) and 22(3), and VMs 20(3) and 20(4), and hypervisor 26(n) supports VSNs 22(4) and 22(5), and VMs 20(5)-20(7). VMs 20(1)-20(7) may provide applications and services, e.g. one or more private networks in a private cloud for end users, e.g., end user 120 (FIG. 1). Each hypervisor 26(1)-26(n) has a virtual switch or Virtual Ethernet Module (VEM, shown as VEMs 28(1)-28 (n), that performs switching at layer 2 of the Open Systems Interconnect (OSI) model. The VEMs 28(1)-28(n) also performs some Quality of Service (Qos), security and monitoring functions. In this example, the VEMs 28(1)-28(n) also perform layer 3 switching and can operate as a single unit across hypervisors. Each hypervisor 26(1)-26(n) also has a virtual service data path (VPATH) 24(1)-24(n), respectively.

VEMs 28(1)-28(n) provide switching and other service for VMs 20(1)-20(7), e.g., inter-VM routing and switching for VM ingress and egress network traffic, while the VDSPs 24(1)-24(n) provide a dedicated traffic pathway for services provided by VSN 22(1)-22(5). The VDSPs 24(1)-24(n) may be in the form of a service overlay path, e.g., a layer 2/3 overlay tunnel. The VPATHs 24(1)-24(n) also give the VSNs mobility that allows them to migrate from one server to another without routing traffic through an inline appliance. By use of a VEM and VPATH architecture, any of the VSNs 22(1)-22(5) may provide services for any of the VMs 20(1)-20(7). Accordingly, when a VM mobility event occurs, e.g. if a VM is moved from one server to another, VSNs that were providing network traffic services for the moved VM will also provide those same services when the moved VM is running on its new server.

In the embodiment of FIG. 2, VSNs may be implemented as having an agent (VA), for example, VSN 22(1) and VSN 22(3) have agents VA 231 and VA 230, respectively, or without an agent, for example, VSN 22(2) and VSNs 22(4)-22(5). For VSN 22(1) and 22(3) the service overlay extends directly into VSN 22(1) and 22(3). When the VSNs are communicating with other entities in the virtual network, including VSMs 20(1)-20(7), the agents VAs 231 and 230 function internally in VSN 22(1) and VSN 22(2), respectively, to provide an API for the VSNs to interface with VPATH, extract metadata received from VPATH, such as, for example, policy identifiers, and provide the data to the VSNs. For VSNs 22(2) and VSNs 22(4)-22(5), which will be referred to collectively in the example embodiments as agentless VSNs, the service overlay terminates in the VEM/VPATH to which an interface of the VSN is connected. The agentless VSNs 22(1)-22(2) and VSNs 22(4)-22(5) may be coupled to the VPATH/VEM through a basic interface in the infrastructure in which the virtual network is implemented, for example, through a VLAN interface. Each interface that is coupled to an input of an agentless VSN may be tagged with a policy identifier identifying the service policy of the VSN and traffic on the virtual overlay associated with the policy identifier may then be sent to the interface tagged with that policy identifier and therefore, to the appropriate VSN. Each interface that is coupled to the output of an agentless VSN may also be tagged with a policy identifier and traffic received on that interface from the VSN may then be identified as serviced output traffic associated with the policy identifier. The need for agents embedded in the VSN has been avoided through this manner of policy identifier propagation.

For example, in the embodiment of FIG. 2, in communications between VSN 22(3) (which includes agent 230) and other entities in the virtual network the service overlay path terminates in VSN 22(3). For communications between VSN 22(2) (which is agentless) and other entities in the virtual network, the service overlay may terminate in VPATH 24(2) of VEM 28(2). In one embodiment, this may be implemented by tagging the inputs and outputs of VSN 22(2) with policy identifiers, t1 and t2, respectively. VPATH 24(2) may then provide communications between other entities in the virtual network and VSN 22(2) by sending and receiving raw data traffic to and from VSN 22(2) by utilizing the tags, t1 and t2. Traffic received on VPATH 24(2) and associated with the policy identifier tagged to t1 may be directed to interface t1 as raw data traffic. The interfaces of the other agentless VSNs may be similarly tagged with policy identifiers. In the embodiment of FIG. 2, VSN 22(2) is connected to VPATH 24(2) of VEM 28(2) through input and output interfaces, t1 and t2, respectively, VSN 22(4) is connected to VPATH 24(n) through input and output, interfaces, t3 and t4, respectively, and VSN 22(5) is connected to VPATH 24(n) through input and output interfaces, t5 and t6, respectively.

The VPATH function can provide the programming through VSM 220 that implements the system functions of agentless VSNs. Upon configuration of an agentless VSN, or at other appropriate times, the VPATH function discovers the switch ports used by the agentless VSN and maps one or more policy identifiers to the interfaces to which the service nodes are connected. VPATH identifies the interface by a required agentless service node identifier that is configured in a port profile configuration. The service node identifier triggers VPATH to learn the IP address of VEM of the service node and the interface on which the VSN is connected. The switch ports associated with interfaces of the corresponding service node are tagged in VPATH as agentless ports. This scheme of discovery allows migration of agentless VSNs to other VEMs transparently, as the destination VPATH in the VEM is automatically programmed to learn the migrated agentless VSN and becomes the terminating VPATH for that agentless VSN. In the embodiment of FIG. 2, in order to support both agentless service nodes and service nodes with embedded agents the VPATH function determines which traffic on the overlay needs to be terminated at the overlay and which traffic needs to continue on the overlay into a service. Only traffic exiting or entering service nodes without agents needs its overlay terminated by the VPATH function. Once an overlay carrying traffic to an agentless service node is terminated by the VPATH at the VEM to which a service node is connected, only raw data traffic (e.g., raw data packets) are forwarded on the appropriate interfaces (agentless ports) to the service node. The appropriate interfaces are identified by the tags on the interface being associated with a policy identifier. The VEM terminating the overlay maintains traffic flow information so that when the service node sends traffic back to the VPATH terminating the overlay, the return traffic can be sent onward to the sending VPATH of the switch from where the traffic originated in the virtual network.

In the embodiment of FIG. 2, the entities other than the agentless service nodes that comprise the network, VSN 22(1), VSN 22(3) and VSMs 20(1)-20(7) may be implemented to operate in conjunction with VPATHs 24(1)-24(n), hypervisors 26(1)-26(n), VSM 220, VNMC 240, switches 230(1)-230(2), and VEMs 28(1)-28(n) in accordance with techniques and method disclosed in co-pending U.S. patent application Ser. No. 13/337,379, "Architecture For Scalable Virtual Network Service", filed on Dec. 27, 2011 and commonly assigned to the assignee of the present application, which is hereby incorporated by reference in its entirety. The network may be modified to allow interaction of the network with the agentless service nodes according to this disclosure. According to example embodiments of this disclosure, the VPATHs 24(1)-24(n), hypervisors 26(1)-26(n), VSM 220, VNMC 240, switches 230(1)-230(2), and VEMs may also be adapted as necessary to allow implementation of the agentless VSNs 22(2), 22(4), and 22(5), into the network and allow appropriate communications between the agentless VSNs 22(2), 22(4), and 22(5), and other entities in the network.

The VSM 220 allows a network team to manage the virtualization environment and to manage network policies by way of port profiles. The VSM 220 employs a service agent (SA) to facilitate the functions of the VSM 220. The VNMC 240 is used by a security/server team to manage the various VMs, security policies and VSNs, e.g., virtual firewalls using service profile that encompasses security policies. For ease of use, VNMC 240 provides a graphical user interface (GUI) for device and policy management. VSM 220 and VNMC may also be adapted as necessary according to the present disclosure to allow implementation of the agentless VSNs 22(2), 22(4), and 22(5).

Figure 3:
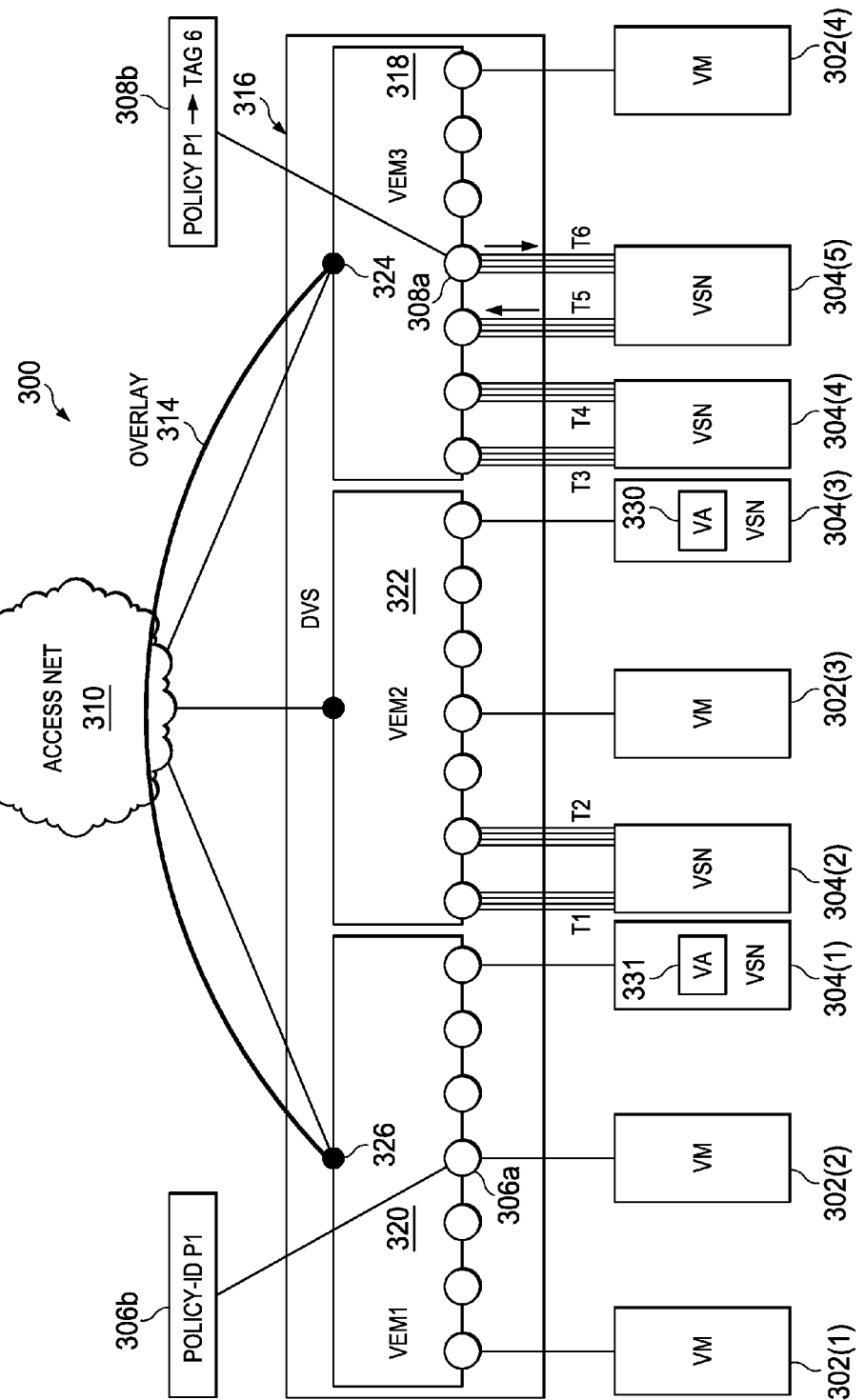
FIG. 3 is a simplified block diagram illustrating example details of a portion of a network using service insertion in accordance with an embodiment of the disclosure.

Referring now to FIG. 3, therein is a simplified block diagram illustrating example details of a portion of a network using service insertion techniques in accordance with the techniques described in relation to the embodiment of FIG. 2 of the disclosure. FIG. 3 shows a network 300 comprising distributed virtual switch (DVS) 316, access net 310, VEMs 318, 320 and 322, VMs 302(1)-302(4) and VSNs 304(1)-304(5). DVS 316 and VEMs 318-322 provide virtual connections, represented by overlay 314, between any of the VMs 302(1)-302(4) and VSNs 304(1)-304(5) through the access net 310 and DVS 316. VEMs 318, 320 and 322, VMs 302(1)-302(4) and VSNs 304(1)-304(5) may be implemented analogously to the VEMs, VMs and VSNs shown and described in FIG. 2, and are connected through a network of switches to a VSM and a VNMC, which are not shown in FIG. 3. VEMs 318-322 provide the functions provided by VEMs 28(1)-28(n) and VPATH 24(1)-24(n) of FIG. 2 and it may be considered that the VEMs 318-322 each include a VPATH function. Access net 310 represents the functions provided by the control and data planes of the embodiment of FIG. 2 that send and route data traffic between the VEMs, VMs and VSNs.

According to embodiment of FIG. 3, VSNs implemented in network 300 may be implemented as agentless VSNs, for example, VSNs 304(2), 304(4) and 304(5). Other VSNs may be implemented as VSNs having agents that are integrated into the functions implementing the virtual overlay path 314, such as VSN 304(1) having agent 331 and VSN 304(3), shown having agent (VA) 330. The interfaces to each of the input and output ports of agentless VSNs 304(2), 304(4) and 304(5) may be tagged with VLAN tags. The interfaces to the input and output ports of 304(2) are tagged t1 and t2, respectively, the interfaces to the input and output ports of 304(4) are tagged t3 and t4, respectively, and the interfaces to the input and output ports of 304(5) are tagged t5 and t6, respectively. The use and insertion of services provided by agentless VSNs in the virtual network does not require modification of the services, for example, use and insertion of service nodes does not require implementation of any API into the VSNs 304(2), 304(4) and 304(5). This is because instead of passing policy identifiers via APIs, as is done with the agents, VA 330 and 331 in VSNs 304(1) and 304(3), respectively, for example, the policy identifiers are mapped to the tags on the interfaces of agentless service nodes 304(2), 304(4) and 304(5). In the example shown in FIG. 3, VSN 304 (5) is an agentless VSN providing a service according to policy identifier (ID) P1.

As an example, when data traffic for VM 302(2) is received in VEM 320 at port 306A, a port profile for port 306A programmed in VPATH indicates that the service identified by policy identifier P1 should be applied to the received traffic. The profile indicates to VEM 320 that the data traffic should be intercepted and forwarded to VSN 304(5) along with policy identifier P1, as shown at block 306B. VEM 320 will include the policy identifier P1 in a service header of the data traffic, encapsulate the service header and data for transmission on the virtual overlay path 314, and send the encapsulated data traffic to VEM 318. Upon receiving the data traffic on the virtual overlay path 314, VEM 318, determines that VSN 304(5) is an agentless VSN, terminates the virtual overlay path, de-encapsulates the data traffic and removes the service header to generate raw data traffic. VEM 318 then maps the policy identifier P1 to the interface tagged with t6, at 308, as shown at block 308b to determine the appropriate interface to which it should send the raw data traffic. The mapping may be done using, for example, a policy mapping table programmed in VPATH. The raw data traffic is sent to the interface tagged t6. VSN 304(5) will know to apply policy P1 to the raw data traffic from the fact that it is received on the interface tagged t6. When serviced raw data is received by VEM 318 from interface t5, VEM 318 may operate to return this raw data traffic to the destination VEM 320 by utilizing, for example, a flow table in which it has cached the source VEM and related metadata when the traffic from and to VEM 318 is layer 2 traffic. Enhanced techniques using information on static switch configurations of the network to determine where to send the return traffic may be used when layer 3 traffic and physical switches are involved. VEM 318 then encapsulates the raw data traffic and sends it back to VEM 320.

Figure 4B:
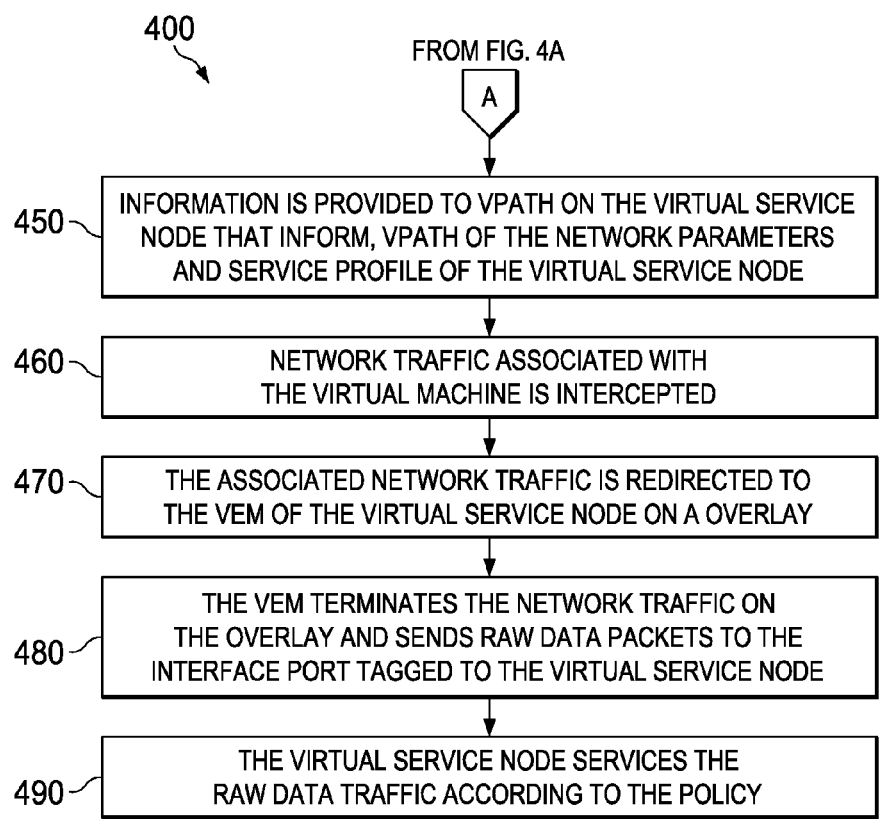

Referring now to FIGS. 4A and 4B, therein are simplified flow diagrams of an example process for a VSM using an agentless VSN, which can be described with reference to FIG. 3. At 410, a virtual service node is started that is configured to provide network traffic services for one or more virtual machines, the virtual service node is connected to the virtual network on an interface. The input and output ports of the VSN, e.g., (VSN 304(5)), are connected to VLAN input and output interfaces coupled to VEM 318. No modification is required internally of VSN 304(5). At 420, the interfaces connected to VSN 304(5) are tagged to a policy identifier in the virtual network. At 430, a VM, e.g., VM 302(2) comes online and is associated with a virtual interface. At 440, a port profile is attached to the virtual interface, where the port profile comprises information configured to identify the service profile to VEM connected to the virtual service node in the form of a policy identifier P1 attached to port 306A. At 450, information is provided VPATH that informs VPATH of the VLAN interfaces of VSN 304(5) and the policy identifiers tagged to the VLAN interfaces connected to VSN 304(5). At 460 data traffic to VM 302(2) is intercepted and at 470 the data traffic, along with its policy identifier, is redirected to the VEM of VSN 304(5). At 480 the virtual overlay for the data traffic is terminated in VEM 318, the received data traffic is de-encapsulated and raw data traffic is sent to input interface t6 which is tagged to the policy identifier in the received data traffic. At step 490, VSN 304(5) then services the raw data traffic according to the policy associated with the input port t6 on which the data traffic was received and returns raw data traffic on the output interface tagged as the output with the policy identifier. The described operations of FIGS. 4A and 4B are illustrative only, and may not need to follow in the order presented. In various embodiments of the disclosures, additional operations may be added or operations may be removed from the operations described.

Figure 5:
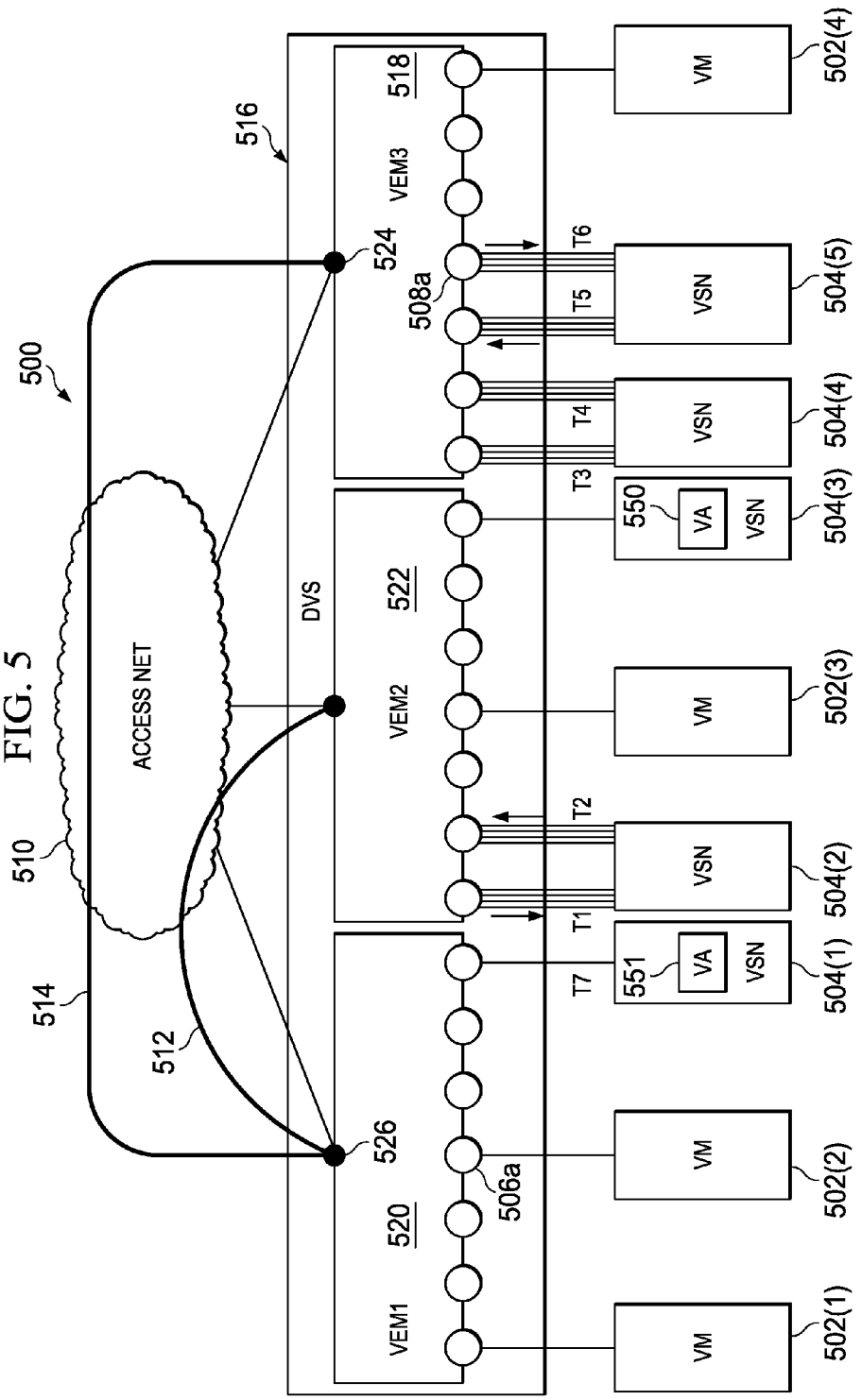
FIG. 5 is a simplified block diagram illustrating example details of a portion of a network using service chaining in accordance with an embodiment of the disclosure.

Services provided by agentless VSNs according to embodiments of the disclosure could also be provided in a chained fashion. Referring to FIG. 5, therein is illustrated a simplified block diagram illustrating example details of a portion of a network using service chaining in accordance with the techniques described in relation to the embodiment of FIG. 2 of the disclosure. FIG. 5 shows a network 500 comprising distributed virtual switch (DVS) 516, access net 510, VEMs 518, 520 and 522, VMs 502(1)-502(4) and VSNs 504(1)-504(5). DVS 516 and VEMs 518-522 provide virtual connections, represented by overlay 514, between any of the VMs 502(1)-502(4) and VSNs 504(1)-504(5) through the access net 510 and DVS 516. VEMs 518, 520 and 522, VMs 502(1)-502(4), VSNs 504(1)-504(5), VEMs 518-522, and Access net 510 may be implemented analogously to the VEMs, VMs and VSNs shown and described in FIG. 3. In an example of service chaining, traffic sent to VM 502(2) may be intercepted at port 506A and steered through an ordered list of service functions that includes the service functions provided by agentless VSN 504(2) and agentless VSN 504(5). The intercepted data traffic is first sent to VEM 522 on overlay 512 where the first policy in the ordered list mapped to the interfaces connected to input t1 and output t2 of VSN 504(2). The data traffic received at VEM 522 is converted to raw data and sent to VSN 504(2) on the interface mapped to t1. The serviced raw data is then received on the interface mapped to output t5, encapsulated for transmission and returned to VEM 526 on overlay 512. VEM 526 then sends the data traffic to VEM 518 where the second policy in the ordered list is mapped to interfaces connected to input t6 and output t5 of VSN 504(5). The data traffic received at VEM 518 is converted to raw data and sent to VSN 504(5) on the interface mapped to t6. The serviced raw data is then received on the interface mapped to output t2, encapsulated for transmission and, in this example, sent back on overlay 514 to VM 502(2).

Figure 6A:
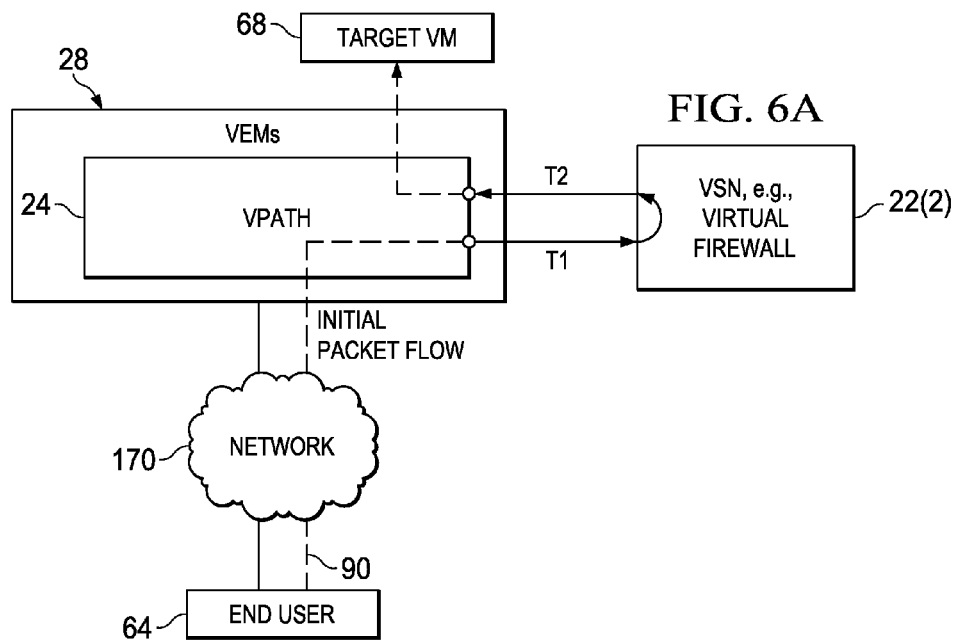
FIGS. 6A and 6B are simplified block diagrams that illustrate virtual service node network traffic service at a virtual switch in accordance with an embodiment of the disclosure.
Figure 6B:
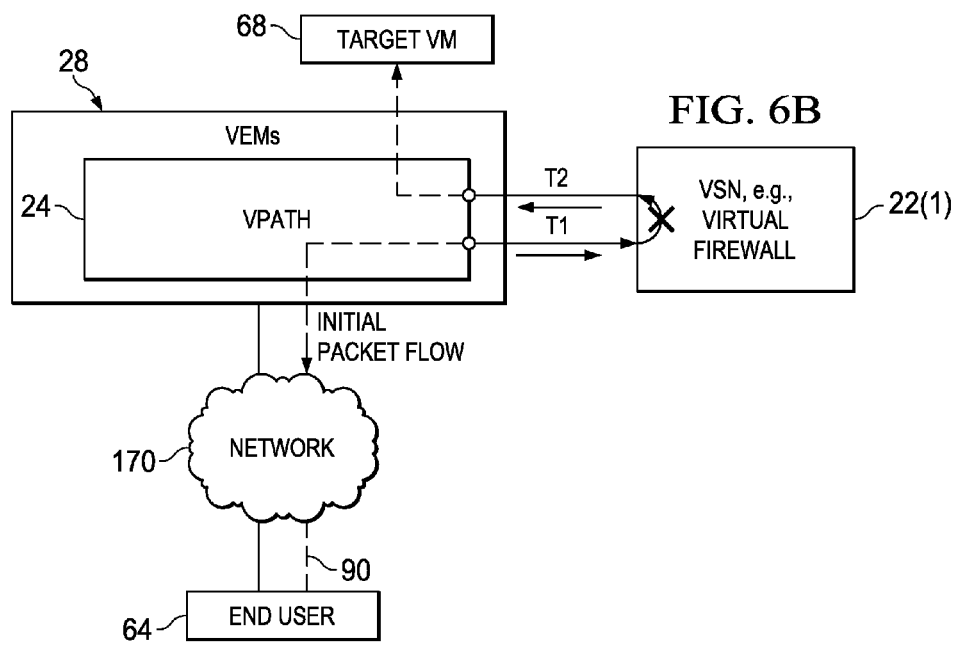

Referring now to FIGS. 6A and 6B, therein are simplified block diagrams that illustrate agentless service node network traffic service at a virtual switch in accordance with an embodiment of the disclosure. In FIGS. 6A and 6B agentless service node provides a virtual firewall function. In FIG. 6A, traffic 90 is received on VPATH 24 of VEM 28 from end user 64 over network 170 on the network overlay path. VEM 28 determines that the traffic 90 is directed toward agentless service node 22(2), de-encapsulates the packet flow into raw data packets, maps the policy identifier received with the data traffic 90 to interface t1 and steers the raw data packets to the interface tagged with t1. VSN 22(2) services the raw data packets and returns the raw data packets on the interface tagged t2 which is mapped to the policy identifier as an output. VEM 28 receives the service raw data packets on t2, encapsulates the serviced raw data packets for transmission on the overlay, and sends the traffic 90 onward toward target VM 68. FIG. 6B shows the identical service components functioning in the same manner except that agentless service node 22(2) services the traffic 90 by blocking the raw data packets from passing.

Figure 7:
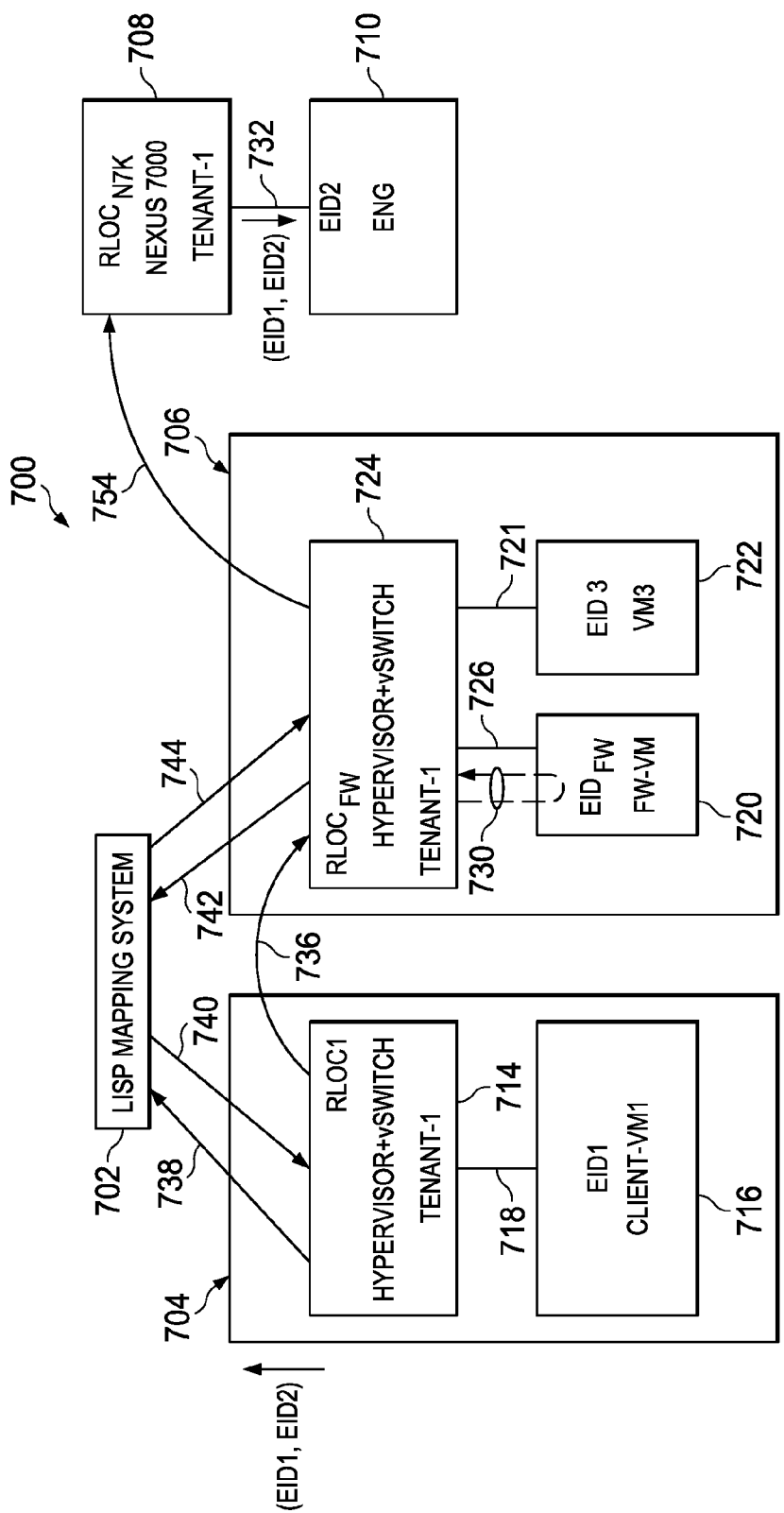
FIG. 7 is a simplified block diagram illustrating an example of a network using service insertion in accordance with a further embodiment of the disclosure.

Referring now to FIG. 7, therein is a simplified block diagram illustrating an example of a network 700 using service insertion in accordance with a further embodiment of the disclosure. The network 700 comprises LISP mapping system 702, servers 704 and 706, switch 708, and server 710 which may be a physical server. Server 704 includes hypervisor/vswitch 714 and virtual machine 716 (Client-VM1). Server 706 includes hypervisor/vswitch 724 and service node 720(FW-VM) and virtual machine 722(VM3). Virtual machine 722 is connected to hypervisor/vswitch 724 by interface 718. Service node 720 is connected to hypervisor/vswitch 724 by interface 726 and virtual machine 716 is connected to hypervisor/vswitch 714 by interface 718. Interfaces 718, 721, and 726 are each shown as a single line connection but include both input and output connections. Network 700 is a network operating according to the LISP protocol which provides an overlay transmission path for communications between servers and other entities in the network. The LISP protocol uses the EID (endpoint identifier) and RLOC (routing locator) name spaces for sending data packets. The EID is the IP address of a host and the RLOC is the IP address of the LISP router for the host. LISP provides an overlay transmission path by encapsulating traffic at the RLOC to RLOC transmission level. In the embodiment of FIG. 7, virtual machine 716 of server 704 initiates a transmission of data traffic from VM1 at EID1 716 to destination EID2 on server 710. Hypervisor/vswitch 714 queries the LISP Mapping System at 738 with a request as to which route a transmission from EID1 to EID2 should take through the system. Mapping System 710 returns information on the routing at 740 which includes LISP overlay paths defined by RLOC addresses, $RLOC_{FW}$ of server 706 and $RLOC_{N7K}$ of switch 708. The Mapping System 710 has been programmed to send traffic sent from EID1 to EID2 to be processed by service node 720 on its route to EID2. The programming of mapping system 702 has associated the data traffic with the service policy of service node 720 by the insertion of $RLOC_{FW}$ in the routing information and by the mapping of $RLOC_{FW}$ to the interface 726 of service node 720 at $EID_{FW}$. Hypervisor/vswitch 714 encapsulates the data according to the LISP protocol for transmission to $RLOC_{FW}$ on overlay path 736. When the data traffic is received at hypervisor/vswitch 724 of server 706 at $RLOC_{FW}$ the encapsulated data traffic is de-encapsulated and sent as shown at 730 to $EID_{FW}$ on interface 726 as raw data traffic. The service node 720 services the raw data and returns raw data on interface 726 to hypervisor/vswitch 724. Hypervisor/vswitch 724 then queries Mapping System 710 at 742 with a request as to which route the data traffic should take next. Mapping System 710 returns a reply that includes route information at 744 that includes the LISP overlay paths defined by RLOC addresses, $RLOC_{FW}$ of server 706 and $RLOC_{N7K}$ of switch 708. Hypervisor/vswitch 724 then knows that the next RLOC destination is $RLOC_{N7K}$ of switch 708. The data is then capsulated according to the LISP Protocol for transmission to $RLOC_{N7K}$ of switch 708 where it is received, de-encapsulated and sent as raw data to host ENG of 710 at EID2.

Mapping system 702 associates the data traffic with the service policy of service node 720 by the insertion of $RLOC_{FW}$ in the routing information and by the mapping of $RLOC_{FW}$ to interface 726 of service node 720 at $EID_{FW}$. The programming of Mapping System 710 and connection of $RLOC_{FW}$ to interface 726 of service node 720 according to the embodiment allows transparent and dynamic insertion of a service node, such as service node 720, into the system without modification of the service node. The data traffic format is not modified and includes the original packet, a tenant ID (if necessary), and the RLOC header as specified by the LISP protocol. When a service node is inserted in the network a new RLOC is added to the mapping system. There should be at least one RLOC associated per every service node. A new EID may also be added if it is desired to virtualize the service or have multiple instances of the same service. A service node can be implemented without modifying the service node or inserting any functions or agents into the service node to interact with the LISP control and data planes.

Figure 8A:
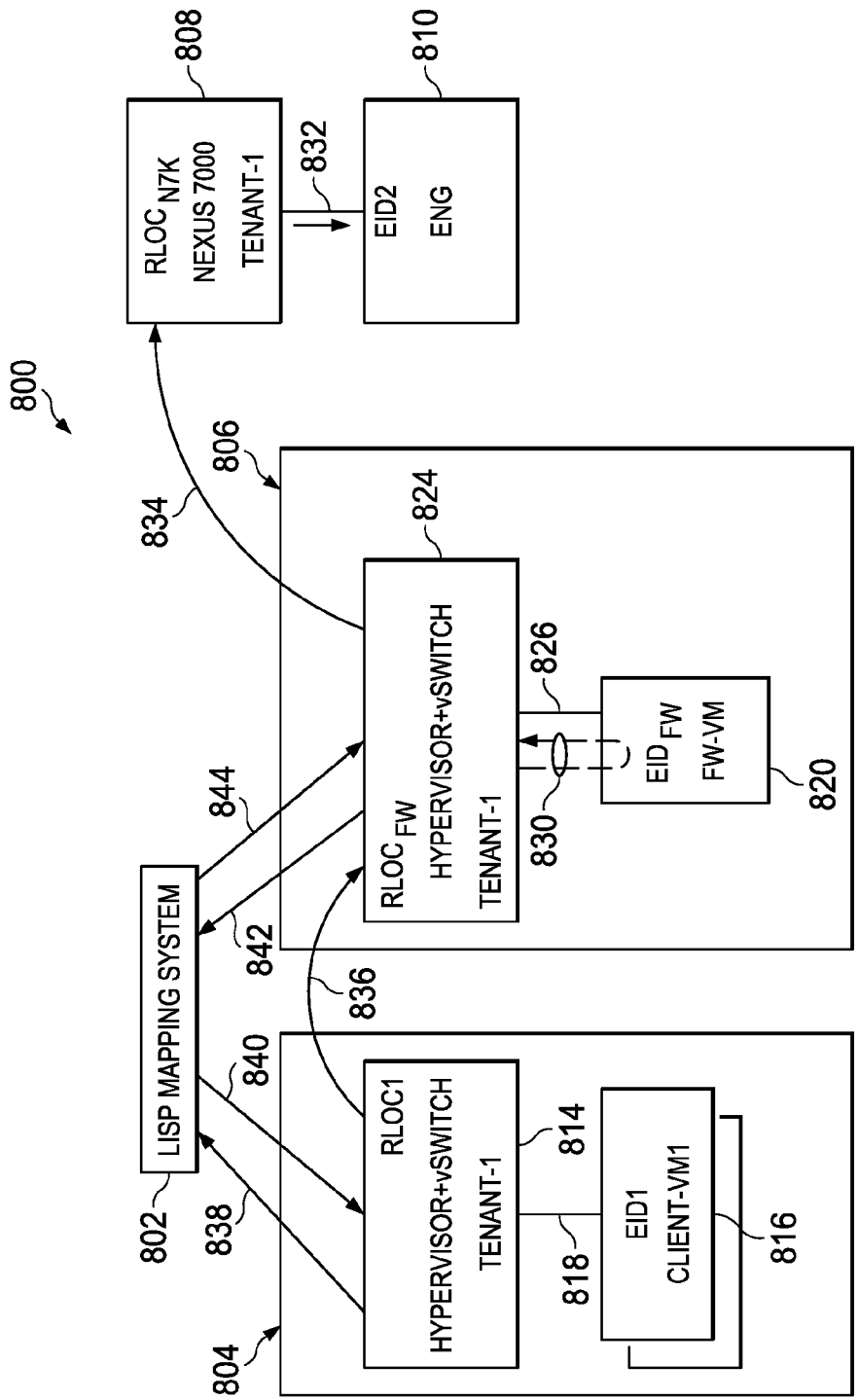
FIGS. 8A and 8B are simplified block diagrams illustrating an example network having service chaining in accordance with a further embodiment of the disclosure.
Figure 8B:
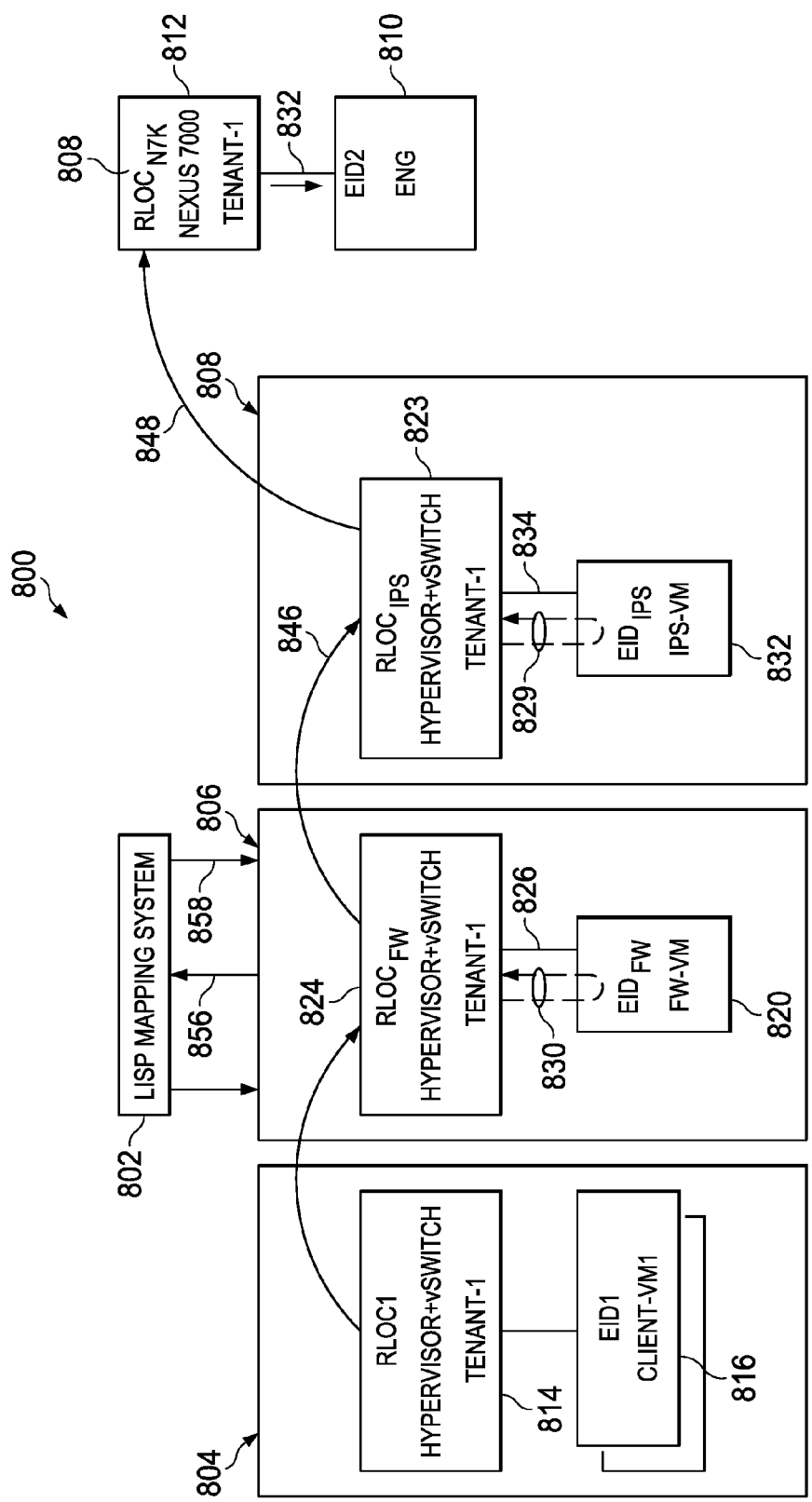

Referring now to FIGS. 8A and 8B, therein are simplified block diagrams illustrating an example network having service node insertion and service chaining in accordance with a further embodiment of the disclosure. FIGS. 8A and 8B illustrate how a server 808 may be dynamically and transparently inserted into the network 800. In FIG. 8A, system 800 functions to implement a transmission from VM1 816 to host ENG of server 810 through service node 820 basically identically to the process of FIG. 7 by which VM1 716 sends data traffic to ENG of server 710 through service node 720 with the reference numerals in the description of the process 700,702, 704, . . . n, replaced with 800, 802, 804, . . . . n, respectively. Turning now to FIG. 8B, in FIG. 8B, service node 822 (IPS-VM), which provides an IPS service in server 808 has been inserted into the network 800 and into the service chain for servicing data traffic sent from VM 816 to host ENG of server 810. Inserting service node 822 into the network 800 did not require any modifications to the service node 822. The LISP Mapping System 802 may be reprogrammed so that after servicing of the data traffic at service node 806, the overlay path at 846 sends the data traffic to $RLOC_{IPS}$. $RLOC_{IPS}$ is the address that effectively is used to associate received data traffic at hypervisor/vswitch 823 with the service node 822. In other words, in the LISP Mapping associates the data traffic sent to hypervisor/switch 823 with the service policy of service node 822 by the insertion of $RLOC_{IPS}$ in the routing information and by the mapping of $RLOC_{IPS}$ to the interface 834 of service node 822 at $EID_{IPS}$. When service node 822 has sent raw data traffic back on interface 834 to hypervisor/vswitch 823, the LISP Mapping System sets the next overlay path to route the data traffic to $RLOC_{N7K}$ at switch 812 and then to host ENG at EDI2 at server 810.

Figure 9C:
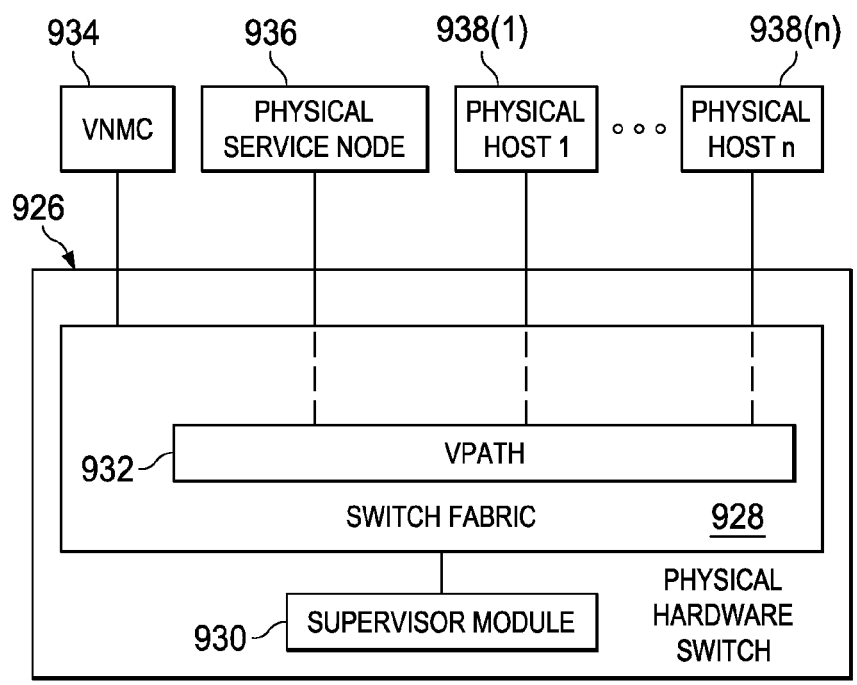

Referring now to FIGS. 9A, 9B, and 9C, therein are shown example block diagrams of servers in which virtual switch functions according to the various example embodiments of the disclosure may be implemented. For example, servers 201(1)-210(n) of FIG. 2, the servers in which VEMs 318-322 of FIG. 3 are implemented, or, the servers 702 and 704 of FIG. 7 with the vswitch function in place of VEM 910 and VPATH 912, may be implemented as shown in FIGS. 9A-9C. The service nodes in FIGS. 9A-9C may be implemented as agentless service nodes by connecting the service nodes to appropriate interfaces. Referring to FIG. 9A, a server host is shown. The server 900 comprises one or more network interface units 902, a processor 906, and a hypervisor 908 with memory for storage. The network interface units 902 are coupled to the processor and are configured to transmit or receive messages over one or more networks or between servers. Additionally, the network interface units are configured to support the VEM 910 and VPATH 912 across multiple servers according to the techniques described herein.

Processor 906 is coupled to the network interface units 902 and to the hypervisor 908. Processor 906 is a microprocessor or microcontroller that is, for example, configured to execute program logic instructions (i.e., software) for carrying out various operations and tasks described herein. Processor 906 may be configured with memory or other storage. Hypervisor 908 is also configured with one or more processors similar to processor 906 and may be referred to herein generally as "processors". Memory used in server 900 may comprise read only memory (ROM), random access memory (RAM), magnetic disk storage devices, optical storage media devices, flash memory devices, electrical, optical or other physical/tangible memory storage devices.

The functions of the processors may be implemented by logic encoded in one or more tangible computer (non-transitory) readable storage media (e.g., embedded logic such as an application specific integrated circuit (ASIC), digital signal processor (DSP) instructions, software that is executed by a processor, etc.), where memory stores data used for the operations described herein and stores software or processor executable instructions that are executed to carry out the operations described herein. The various functions and components of the embodiments may take any of a variety of forms, so as to be encoded in one or more tangible readable memory media or storage device for execution, such as fixed logic or programmable logic. (e.g., software/computer instructions executed by a processor) and the processors may be ASICs that comprises fixed digital logic, or a combination thereof. For example, the processors may be embodied by digital logic gates in a fixed or programmable digital logic integrated circuit, which digital logic gates are configured to perform various functions described herein. In general, the components may be embodied in one or more computer readable storage media encoded with software comprising computer executable instructions and when the software is executed operable to perform the operations described herein.

Referring now to FIG. 9B, therein is a second example of a block diagram of a server into which virtual switch functions according to the various example embodiments of the disclosure may be implemented. In FIG. 9B, a network interface card 922 is shown that may be one of the interfaces 902 of FIG. 9A. The functions of the hypervisor 908 and the components shown in FIG. 9A remain relatively the same, with the exception that VPATH functionality has been moved from the hypervisor 908 to the network card 922 and is labeled with reference number 924.

Referring now to FIG. 9C, therein is another example of a block diagram of a server into which virtual switch functions according to the various example embodiments of the disclosure may be implemented. A physical hardware switch 926 is deployed in a data center. Switch 926 comprises a supervisor module 930 and switch fabric 928. VEM/VPATH 932 is hosted within the switch fabric 928. Switch 926 interfaces with VNMC 934, physical services node 936, and physical hosts 938(1)-938(n). VNMC 934 resides in a virtual network as a VM. Physical hosts 938(1)-938(n) support a plurality of VMs in a virtual network. VPATH 932 forwards traffic to physical service node 936 in the same way it would forward VM traffic to a VSN.

Note that in this Specification, references to various features (e.g., elements, structures, modules, components, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communications within the systems of the embodiments may be applicable to other exchanges or routing protocols. Moreover, although the systems of the embodiments have been illustrated with reference to particular elements and operations that facilitate the communication process, these elements, and operations may be replaced by any other suitable architecture or process that achieves the intended functionality of the embodiments.

Numerous other changes, substitutions, variations, alterations, and modifications may be readily ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus, comprising:
   one or more interfaces configured to interface with one or more service nodes; a switch function coupled to the one or more interfaces, and configured to form at least a portion of an overlay path; and
   one or more processors coupled to the one or more interfaces and the switch function, wherein the apparatus is configured to:
     terminate the at least a portion of the overlay path in the switch function when data traffic associated with a service policy is received on the overlay path, the data traffic comprising overlay data traffic on the overlay path encapsulated in a form for transmission on the overlay path, wherein the data traffic is associated with the service policy based on an identifier;
     convert the overlay data traffic to raw data traffic; and
     send the raw data traffic from the switch function on a selected interface of the one or more interfaces, the selected interface corresponding to the service policy associated with the data traffic and coupled to a selected service node of the one or more service nodes.

2. The apparatus of claim 1, wherein the selected interface comprises a first interface, the overlay data traffic comprises first overlay data traffic, the raw data traffic comprises first raw data traffic, and the switch function is configured to receive second raw data traffic sent from the selected service node on a second interface mapped to an output of the service node corresponding to the service policy associated with the first overlay data traffic, and wherein the apparatus is configured to convert the second raw data traffic to second overlay data traffic in a form encapsulated for transmission on the overlay path and initiate sending of the second overlay data traffic onto the overlay path from the switch function.

3. The apparatus of claim 2, wherein the switch function comprises a destination switch function and the first overlay data traffic is sent from a source switch function, and the apparatus is configured to maintain information on the source switch function and initiate sending of the second overlay data traffic onto the overlay path back to the source switch function.

4. The apparatus of claim 2, wherein the switch function comprises a first switch function and the first overlay traffic is sent from a second switch function, and the apparatus is configured to initiate sending of the second overlay data traffic onto the overlay path to a third switch function.

5. The apparatus of claim 1, wherein the identifier comprises a policy identifier associated with the data traffic, and wherein the apparatus is configured to identify the selected interface on which to send the raw data traffic from the switch function by mapping the policy identifier associated with the data traffic to a VLAN tag corresponding to a policy identifier of a service provided by the selected service node.

6. The apparatus of claim 1, wherein the identifier comprises a Routing Locator (RLOC) value, and wherein the overlay path is implemented according to a Locator Identifier Separation Protocol (LISP) mapping function and the data traffic is associated with the service policy by mapping the RLOC value to the selected interface.

7. The apparatus of claim 1, wherein the identifier comprises a policy identifier of the service policy, and wherein the overlay path is implemented in a virtual network comprising a virtual switching function including a Virtual Supervisor Module (VSM) and a Virtual Ethernet Module (VEM) and the data traffic is associated with the service policy by including the policy identifier of the service policy in the data traffic.

8. The apparatus of claim 1, wherein the service policy comprises a first service policy and wherein the virtual switching network is configured to discover a newly instantiated service node of the one or more service nodes connected to a newly connected interface of the one or more interfaces through a service node identifier identifying the newly instantiated service node as an agentless service node and map the newly connected interface to a second service policy.

9. A method comprising:
   receiving data traffic associated with a service policy on an overlay path, the data traffic comprising first overlay data traffic on the overlay path encapsulated in a form for transmission on the overlay path;
   terminating the overlay path;
   converting the first overlay data traffic to first raw data traffic;
   sending the first raw data traffic on a first interface corresponding to the service policy associated with the data traffic and coupled to a service node;
   receiving second raw data traffic sent from the service node on a second interface mapped to an output of the service node corresponding to the service policy associated with the first overlay data traffic;
   converting the second raw data traffic to second overlay data traffic in the form encapsulated for transmission on the overlay path.

10. The method of claim 9, wherein the first overlay data traffic is sent from a source, and wherein the method further comprises maintaining information on the source and sending the second overlay data traffic onto the overlay path back to the source.

11. The method of claim 9, wherein the service node is a first service node in a plurality of chained service nodes providing a chained service policy, the first overlay data traffic is of overlay communications subject to the chained service policy, and wherein the method further comprises sending the second overlay data traffic onto the overlay path to a second service node of the chained service nodes.

12. The method of claim 9, further comprising:
   discovering a newly instantiated service node connected to a newly connected interface through a service node identifier identifying the newly instantiated service node as an agentless service node; and mapping the newly connected interface to a second service policy.

13. The method of claim 9, wherein the overlay path is configured according to a Locator Identifier Separation Protocol (LISP) mapping function and the data traffic is associated with the service policy by mapping a Routing Locator RLOC value to the first interface.

14. The method of claim 9, wherein the overlay path is implemented in a virtual network comprising a virtual switching function including a Virtual Supervisor Module (VSM) and a Virtual Ethernet Module (VEM) and the data traffic is associated with the service policy by including the policy identifier of the service policy in the data traffic.

15. The method of claim 9, further comprising:
    identifying the first interface by mapping the service policy associated with the data traffic to a VLAN tag corresponding to the first interface, and wherein the sending comprises sending the first raw data traffic on the first interface mapped to the service policy.

16. One or more non-transitory tangible media that includes code for execution and when executed by a processor operable to perform operations comprising:
    receiving data traffic associated with a service policy on an overlay path, the data traffic comprising first overlay data traffic on the overlay path encapsulated in a form for transmission on the overlay path;
    terminating the overlay path;
    converting the first overlay data traffic to first raw data traffic;
    sending the first raw data traffic on a first interface corresponding to the service policy associated with the data traffic and coupled to a service node;
    receiving second raw data traffic sent from the service node on a second interface coupled to an output of the service node corresponding to the service policy associated with the first overlay data traffic; and
    converting the second raw data traffic to second overlay data traffic in a form encapsulated for transmission on the overlay path.

17. The one or more non-transitory tangible media of claim 16, wherein the overlay path is configured according to a Locator Identifier Separation Protocol (LISP) mapping function and the data traffic is associated with the service policy by mapping a Routing Locator RLOC value to the first interface.

18. The one or more non-transitory tangible media of claim 16, wherein the overlay path is implemented in a virtual network comprising a virtual switching function including a Virtual Supervisor Module (VSM) and a Virtual Ethernet Module (VEM) and the data traffic is associated with the service policy by including the policy identifier of the service policy in the data traffic.

19. The one or more non-transitory tangible media of claim 16, further comprising:
    identifying the first interface by mapping the service policy associated with the data traffic to a VLAN tag corresponding to the first interface, and wherein the sending comprises sending the first raw data traffic on the first interface mapped to the service policy.

20. The one or more non-transitory tangible media of claim 16, wherein the first overlay data traffic is sent from a source, and wherein the method further comprises maintaining information on the source and sending the second overlay data traffic onto the overlay path back to the source.

21. The one or more non-transitory tangible media of claim 16, wherein the service node is a first service node in a plurality of chained service nodes providing a chained service policy, the first overlay data traffic is of overlay communications subject to the chained service policy, and wherein the method further comprises sending the second overlay data traffic onto the overlay path to a second service node of the chained service nodes.

* * * * *